(12) United States Patent
Corveleyn et al.

(10) Patent No.: US 7,507,444 B2
(45) Date of Patent: Mar. 24, 2009

(54) METHOD OF BONDING A FLUOROPOLYMER TO A SILICONE LAYER

(75) Inventors: Steven G. Corveleyn, Knokke-Heist (BE); Eduard M. Horemans, Brasschaat (BE)

(73) Assignee: 3M Innovative Properties Company, St. Paul, MN (US)

( * ) Notice: Subject to any disclaimer, the term of this patent is extended or adjusted under 35 U.S.C. 154(b) by 468 days.

(21) Appl. No.: 11/424,633

(22) Filed: Jun. 16, 2006

(65) Prior Publication Data

US 2007/0014994 A1     Jan. 18, 2007

(30) Foreign Application Priority Data

Jun. 17, 2005   (GB)   ............... 0512331.0

(51) Int. Cl.
*B05D 3/02*   (2006.01)
(52) U.S. Cl. .................. 427/387; 427/393.5
(58) Field of Classification Search .......... None
See application file for complete search history.

(56) References Cited

U.S. PATENT DOCUMENTS

| 3,419,593 A | 12/1968 | Willing |
| 3,775,452 A | 11/1973 | Karstedt |
| 4,631,310 A | 12/1986 | Chandra et al. |
| 4,767,726 A | 8/1988 | Marshall |
| 5,569,689 A | 10/1996 | Stein |
| 5,962,127 A | 10/1999 | Maxson |
| 6,020,038 A | 2/2000 | Chen et al. |
| 6,136,447 A | 10/2000 | Nakamura et al. |
| 6,313,217 B1 | 11/2001 | Barthel et al. |
| 6,354,620 B1 * | 3/2002 | Budden et al. ........... 280/728.1 |
| 2002/0146575 A1 | 10/2002 | Shudo |
| 2004/0006173 A1 | 1/2004 | Hierstetter et al. |
| 2004/0253436 A1 | 12/2004 | Heeks et al. |
| 2006/0189767 A1 * | 8/2006 | Bhagwagar et al. ......... 525/477 |

FOREIGN PATENT DOCUMENTS

| EP | 0 654 494 A1 | 5/1995 |
| EP | 1 454 740 A1 | 9/2004 |
| EP | 1 454 740 | 2/2006 |
| WO | WO 00/13891 | 3/2000 |
| WO | WO 03/037621 | 5/2003 |

\* cited by examiner

*Primary Examiner*—Erma Cameron
(74) *Attorney, Agent, or Firm*—Julie Lapos-Kuchar

(57) ABSTRACT

The present invention relates to a method of bonding a fluoropolymer layer to a silicone layer by (i) providing a fluoropolymer layer comprising a fluoropolymer capable of being dehydrofluorinated (ii) providing a silicone layer comprising a curable silicone composition comprising (a) an organopolysiloxane compound having SiH groups, (b) an organopolysiloxane compound having aliphatic carbon-carbon unsaturated bonds, (c) a hydrosilylation catalyst and (d) an amino compound having (1) an amine function of the formula —NHR wherein R is hydrogen or an organic group and (2) a silyl group of the formula —Si$R^1_n$(O$R^2$)$_{3-n}$ wherein $R^1$ represents an alkyl or aryl group, $R^2$ represents an alkyl group of 2 to 6 carbon atoms and n is 1 or 2 and (iii) contacting said silicone layer and said fluoropolymer layer and causing said curable silicone composition of said silicone layer to cure.

9 Claims, No Drawings

METHOD OF BONDING A FLUOROPOLYMER TO A SILICONE LAYER

CROSS-REFERENCE TO RELATED APPLICATION

This application claims priority to Great Britain Patent Application No. GB0512331.0, filed on Jun. 17, 2005, herein incorporated by reference in its entirety.

FIELD OF THE INVENTION

The present invention relates to a method of bonding a fluoropolymer layer to a silicone layer. In particular, the fluoropolymer layer is capable of dehydrofluorination and the silicone layer is a silicone layer curable by a hydrosilylation catalyst.

BACKGROUND OF THE INVENTION

The beneficial properties of fluoropolymers are well known in the art and include for example, high temperature resistance, high chemical resistance including for example high resistance to solvents, fuels and corrosive chemicals, and non-flammability. Because of these beneficial properties, fluoropolymers find wide application particularly where materials are exposed to high temperature and/or chemicals.

Fluoropolymers are generally more expensive than non-fluorine polymers and accordingly, materials have been developed in which the fluoropolymer is used in combination with other materials to reduce the overall cost of an article. Also, fluoropolymer layers find application as protective layers to protect an article against surrounding conditions such as for example in exterior applications against weather conditions. Generally, it will be required in these applications that the fluoropolymer be bonded to other materials and layers in the article. Unfortunately, bonding of fluoropolymers to other substrates is often difficult and in particular bonding to silicone layers has been found difficult. To solve this problem, tie layers have been proposed between the fluoropolymer and other materials such as a silicone elastomer, but this increases cost and makes the manufacturing more complicated.

WO 03/037621 discloses the use of an organic compound having a hydride function such as for example a silicone hydride to improve the bonding between a silicone elastomer and a fluoropolymer layer.

SUMMARY OF THE INVENTION

It would now be desirable to find a further method of improving the bonding between a fluoropolymer layer and a silicone rubber. In particular, it would be desirable to improve the bonding of a fluoropolymer layer to a silicone rubber that is based on a curing system involving a hydrosilylation reaction.

Thus, in one aspect, the present invention relates to a method of bonding a fluoropolymer layer to a silicone layer by (i) providing a fluoropolymer layer comprising a fluoropolymer capable of being dehydrofluorinated (ii) providing a silicone layer comprising a curable silicone composition comprising (a) an organopolysiloxane compound having SiH groups, (b) an organopolysiloxane compound having aliphatic carbon-carbon unsaturated bonds, (c) a hydrosilylation catalyst and (d) an amino compound having (1) an amine function of the formula —NHR wherein R is hydrogen or an organic group and (2) a silyl group of the formula —SiR$^1_n$(OR$^2$)$_{3-n}$ wherein R$^1$ represents an alkyl or aryl group, R$^2$ represents an alkyl group of 2 to 6 carbon atoms and n is 1 or 2 and (iii) contacting said silicone layer and said fluoropolymer layer and causing said curable silicone composition of said silicone layer to cure.

DETAILED DESCRIPTION OF THE INVENTION

Fluoropolymer Layer

The fluoropolymer layer comprises a fluoropolymer that is capable of being dehydrofluorinated. The term "fluoropolymer layer" as used herein is intended to include not only layers consisting only of fluoropolymer but also layers comprising fluoropolymer and optional further components. Generally, the fluoropolymer layer will comprise the fluoropolymer in an amount of at least 85% by weight, particularly suitable in an amount of at least 95% by weight based on the weight of the fluoropolymer layer.

The fluoropolymer is capable of being dehydrofluorinated. Typically, the fluoropolymer will readily dehydrofluorinate when exposed to a base such as for example an amine. Fluoropolymers capable of dehydrofluorination that can be used with this invention include those that have a microstructure in the polymer backbone where a carbon bonded hydrogen atom is located between carbon bonded fluorine atoms. The reactivity in dehydrofluorination of a carbon bonded hydrogen may be further enhanced when the carbon atom to which the hydrogen is bonded, is adjacent to, or attached to a carbon atom possessing a carbon bonded —CF$_3$ group (supplied by hexafluoropropylene (HFP) or 2-hydropentafluoropropylene for instance) or another electron withdrawing group. Conveniently, the fluoropolymer capable of dehydrofluorination is derived from vinylidene fluoride ("VF$_2$" or "VDF") and fluoropolymers derived from other monomers which, when polymerized, form monomer sequences similar to polymerized vinylidene fluoride. Examples of such other monomers include ethylenically unsaturated monomers which, when incorporated into fluoropolymers, can produce a similar (including an identical) polymeric microstructure in the backbone as the polymerized VDF. Such polymers are also prone to dehydrofluorination thereby forming reactive sites that can react with the amino compound that is included in the silicone layer and that will be described in more detail below. Without intending to be bound by any theory, it is believed that upon curing of the silicone layer, the amino compound causes a chemical link to be formed between the fluoropolymer and the cured silicone composition at the interface of both layers. Monomers suitable for forming sites in the fluoropolymer that are capable of dehydrofluorination include VDF, 1-hydropentafluoropropene, 2-hydropentafluoropropene, and trifluoroethylene.

Dehydrofluorination of the fluoropolymer typically takes place during curing of the laminate, i.e. the reactive sites, typically double bonds within the backbone of the fluoropolymer are created in-situ. The fluoropolymers capable of dehydrofluorination generally comprise at least 3% by weight of interpolymerized units derived from VDF or other monomers with similar reactivity when polymerized. Typically, the fluoropolymer capable of dehydrofluorination is formed from a fluorine-containing monomer selected from the group of vinylidene fluoride, trifluoroethylene, 1-hydropentafluoropropylene, 2-hydropentafluoropropylene, mixtures thereof, and optionally one or more monomers copolymerizable therewith. In a particular embodiment, the fluoropolymer includes units deriving from VDF and one or more fluorine-containing monomers such as hexafluoropropene (HFP), tetrafluoroethylene (TFE), chlorotrifluoroethylene (CTFE), 2-chloropentafluoropropene, a fluorinated vinyl ether, including a perfluoroalkyl vinyl ether such as $CF_3OCF=CF_2$, $CF_3CF_2CF_2OCF=CF_2$ or $CF_3OCF_2CF_2CF_2OCF=CF_2$. Certain fluorine-containing di-olefins are also useful, such as, perfluorodiallyether and perfluoro-1,3-butadiene. Further suitable comonomers include non-fluorinated monomers such as unsaturated olefin comonomers, e.g., ethylene, propylene or butadiene. Preferably, at least 50% by weight of all monomers in a polymerizable mixture are fluorine containing. In one particular embodiment, the fluoropolymer comprises repeating units derived from TFE, HFP and VDF (THV). In a further particular embodiment, the fluoropolymer comprises repeating units derived from tetrafluoroethylene, vinylidene fluoride, hexafluoropropylene and perfluoro (n-propyl vinyl) ether.

In general, the fluoropolymers being capable of dehydrofluorination are melt-processible. With the term "melt-processible" is meant that the fluoropolymer has a sufficiently low melt viscosity such that it can be processed with commonly used melt extrusion equipment. Typically, the fluoropolymer capable of dehydrofluorination that is used in the fluoropolymer layer is a so-called semicrystalline fluoropolymer, i.e. the fluoropolymer shows a distinct and clearly discernable melting point. Useful semicrystalline fluoropolymer include those that have a melting point between 60° C. and 320° C., typically between 100° C. and 300° C. Blends of semicrystalline fluoropolymers as well as blends of semicrystalline with amorphous fluoropolymers may be used.

The fluoropolymers for use with this invention can be produced by any suitable polymerization technique including polymerization in solvent medium as well as in aqueous medium. Typically, the fluoropolymer is produced by an aqueous emulsion polymerization process of the constituting monomers.

The composition for making the fluoropolymer layer may further contain in admixture with the fluoropolymer(s) capable of dehydrofluorination, one or more fluoropolymers that are not capable of dehydrofluorination. Generally, a major amount (e.g. at least 51% by weight, preferably at least 60% by weight and more preferably at least 80% by weight based on the total weight of fluoropolymer) should be composed of the fluoropolymer capable of dehydrofluorination.

The fluoropolymer composition for providing the fluoropolymer layer may further contain additives, such as stabilizers, plasticizers, lubricants, fillers and processing aids to obtain particular desired properties. In a particular embodiment of the invention, the fluoropolymer may include glass microspheres, more in particular solid and hollow high strength glass microspheres. The addition of glass microspheres to the fluoropolymer layer may provide the advantage of preventing blocking that may occur when sheets of the fluoropolymer layer are stacked or when the fluoropolymer layer is wound on itself in a roll.

In a preferred embodiment, the glass microspheres have a sufficient strength so as to withstand the conditions typically encountered during extrusion of the fluoropolymer into a fluoropolymer film. Useful microspheres include those that are solid as well as those that are hollow. Although preferred, it is generally not required that the microspheres are true spheres. It particular, it is contemplated that the microspheres may have a shape deviating somewhat from a true sphere such as for example ellipsoidal or cratered spheres. Typically, the microspheres have an average diameter 5 to 100 micrometers in diameter and particularly from 25 to 50 micrometers. Microspheres comprising different sizes or a range of sizes may be used. Particularly useful microspheres are those that have a collapse strength in excess of 5000 psi, for example in excess of 10000 psi, or in excess of 18000 psi. Such microspheres are particularly suitable when the fluoropolymer layer is produced by extrusion of a fluoropolymer composition. The density of hollow microspheres when used may vary from 0.3 to 0.9 g/cm³. Glass microspheres having a density from 0.5 to 0.7 g/cm³ are particularly useful in applications where comparatively lightweight micropheres having high resistance to crushing is desired. These microspheres typically have a chemical composition, expressed in weight percent, consisting essentially of 60-80% $SiO_2$, 5-16% $Na_2O$, 5-25% CaO, 0-10% $K_2O+Li_2O$, 5-16% $Na_2O+K_2O+Li_2O$ and 0-15% $B_2O_3$. Hollow glass microspheres are known in the art and described for example in U.S. Pat. No. 4,767,726. Further suitable glass microspheres that may be used in this invention include those that are commercially available from 3M Company such as those sold under the tradename Scotchlite™ S60HS. When used, the glass microspheres are typically added in an amount between 0.05 to 3% by weight based on the weight of the fluoropolymer.

Typically, the fluoropolymer layer is obtained by extruding the fluoropolymer, optionally comprising glass microspheres, at a temperature between 200° C. and 300° C., to a film having a thickness between 50 and 500μ. If transparency of the fluoropolymer is an important consideration, the thickness of the fluoropolymer layer, optionally comprising glass microspheres is generally between 50 and 200μ.

The fluoropolymer layer may alternatively be formed by casting a fluoropolymer composition from a solvent or by sintering and skiving.

Curable Silicone Composition

The silicone layer of the present invention comprises a curable silicone composition comprising (a) an organopolysiloxane compound having SiH groups (hereinafter also referred to as organopolysiloxane compound (a) or compound (a)) and (b) organopolysiloxane compound having aliphatic carbon-carbon unsaturated bonds (hereinafter also referred to as organopolysiloxane compound (b) or compound (b)).

Suitable organopolysiloxane compounds having SiH groups include linear, cyclic or branched siloxanes comprising units of the formula (I)

wherein each $R^3$ independently represents a hydrogen atom or optionally a substituted, SiC-bonded aliphatic saturated hydrocarbon group of 1 to 18 carbon atoms, where not more than one $R^3$ group per silicon atom can have the meaning of a hydrogen atom; u represents an integer of 0, 1, 2 or 3, and v represents an integer of 0, 1 or 2, with the proviso that the sum of u+v is less than or equal to 3 and on average there are at least two Si-bonded hydrogen atoms per molecule.

Particular suitable organopolysiloxane compounds contain three or more SiH bonds per molecule. When an organopolysiloxane compound (a) is used which contains only two SiH bonds per molecule, the organopolysiloxane compound having aliphatic carbon-carbon unsaturated bonds (b) preferably includes at least three unsaturated groups per molecule. The organopolysiloxane (a) acts as a crosslinking agent. The hydrogen content in the compound (a) as it relates exclusively to the hydrogen atoms bonded directly to silicon atoms, is in the range from 0.002% to 1.7% by weight of hydrogen, preferably between 0.1% and 1.7% by weight of hydrogen. Typically, the organopolysiloxane compound (a) is present in the curable silicone composition in an amount such that the molar ratio of SiH groups to groups with aliphatic carbon-carbon unsaturated bonds of the compound (b) is between 0.5 and 5, preferably between 1.0 and 3.0.

The organopolysiloxane compounds (b) for use in the curable silicone composition are typically linear, cyclic or branched siloxanes. They typically have on average 1.5 or more aliphatic unsaturated carbon-carbon bonds and may comprise mixtures of organopolysiloxanes having two or more unsaturated bonds with organopolysiloxanes that have only one double bond. Also, blends of polysiloxanes of different molecular weight may be used.

In one embodiment compound (b) comprises an organopolysiloxane comprising units of the formula (II):

$$R^4_s R^5_t SiO_{(4-s-t)/2} \quad (II)$$

wherein each $R^4$ independently represents a SiC-bonded, aliphatic unsaturated hydrocarbon group of 2 to 18 carbon atoms, each $R^5$ independently represents a hydrogen atom or optionally substituted, SiC-bonded aliphatic saturated hydrocarbon group of 1 to 18 carbon atoms, where not more than one $R^5$ group per silicon atom can have the meaning of a hydrogen atom; s is 0, 1 or 2, and t is 0, 1, 2 or 3, with the proviso that the sum s+t is less than or equal to 3 and at least two groups $R^4$ are present per molecule. Typically, the organopolysiloxane of formula (II) will have 18 or more silicon atoms.

Examples of groups $R^4$ include aliphatic unsaturated groups that are accessible to a hydrosilylation reaction with a SiH-functional compound. Specific examples of group $R^4$ comprise hydrocarbon groups having an aliphatic multiple bond with 2 to 6 carbon atoms, such as vinyl, allyl, methallyl, 1-propenyl, 1-butenyl, 1-pentenyl group, 5-hexenyl, butadienyl, hexadienyl, cyclopentenyl, cyclopentadienyl, cyclohexenyl, ethynyl, propargyl and 1-propynyl group. Particularly suitable groups $R^4$ include vinyl and groups. Examples of groups $R^5$ include hydrogen and hydrocarbon groups of 1 to 18 carbon atoms, such as methyl, ethyl, n-propyl, isopropyl, n-butyl, isobutyl, tert-butyl, n-pentyl, isopentyl, neopentyl, tert-pentyl, hexyl, heptyl, octyl, including n-octyl and isooctyl, such as 2,2,4-trimethylpentyl group, nonyl, decyl, dodecyl and octadecyl groups. Further examples include cycloalkyl groups, such as cyclopentyl, cyclohexyl, cycloheptyl and methylcyclohexyl groups; aryl groups, such as phenyl, biphenyl, naphtyl and anthryl and penanthryl groups; aralkyl groups, such as o-, m-, p-tolyl radials, xylyl groups and ethylphenyl groups; aralkyl groups, such as the benzyl group, α- and β-pheylethyl group. Examples of substituted hydrocarbon groups are halogenated alkyl groups, such as 3-chloropropyl, 3,3,3-trifluorpropyl and perfluorohexylethyl group, halogenated aryl groups, such as p-chlorophenyl and p-chlorobenzyl group.

Specific examples of organopolysiloxanes (b) according to formula (II) include for example: $(ViMe_2SiO_{1/2})(ViMeSiO)_{0-50}(Me_2SiO)_{30-2000}(ViMe_2SiO_{1/2})$, where Me represents a methyl group and Vi represents a vinyl group.

Further suitable organopolysiloxane compounds having aliphatic carbon-carbon unsaturated bonds include compounds having 2 to 17 silicon atoms, comprising units of the formula (III):

$$R^6_a R^7_b (OR^8)_c SiO_{4-(a+b+c)/2} \quad (III)$$

wherein each $R^6$ independently represents a hydrogen atom or optionally substituted, SiC-bonded aliphatic saturated hydrocarbon group of 1 to 18 carbon atoms, as given for the $R^5$ group of formula (II), where not more than one group $R^6$ per silicon atom can have the meaning of hydrogen atom; each $R^7$ independently represents a SiC-bonded, aliphatic unsaturated hydrocarbon group of 2 to 18 carbon atoms as is given for $R^5$ group of formula (II) above; each $R^8$ independently represents a hydrogen atom or optionally substituted hydrocarbon group of 1 to 18 carbon atoms, which can be interrupted by one or more oxygen atoms; a, b and c represent integers of 0, 1, 2 or 3 and the sum of a, b and c is less than or equal to 3 and at least one group $R^7$ is present per molecule.

Typical examples of organopolysiloxane compounds according to formula (III) include compounds having M units of formula (III), where a+b=3, Q units of formula (III) where a+b=0 and/or T units of formula (III) where a+b=1. The organopolysiloxanes according to formula (III) typically have a numerical ratio of M units to the sum of the Q units and/or T units of greater than or equal to 2, for example greater than or equal to 2.5.

The organopolysiloxane compounds according to formula (III) typically have a molecular weight of not more than 2500 g/mol, particularly not more than 1000 g/mol, more in particular not more than 500 g/mol.

Examples of organopolysiloxane compounds according to formula (III) include those that contain from 4 to 10 silicon atoms. Specific examples include:

$(ViMe_2SiO)_3SiH$ $(ViMe_2SiO)_4Si$ $(ViMe_2SiO)_3(Me_3SiO)Si$ $(ViMe_2SiO)_3SiMe$ $(ViMe_2SiO)_3SiVi$ where M represents a methyl group and Vi represents a vinyl group.

In a particular embodiment, organopolysiloxanes of formula (III) are used in admixture with organopolysiloxanes of formula (II), in particular those that have 18 or more silicon atoms. In such a mixture the organopolysiloxane compounds according to formula (III) will be used in amounts between 0.01% to 10% by weight, particularly between 0.05% and 20% by weight, based on the total weight of organopolysiloxanes in the curable silicone composition.

Still further suitable organopolysiloxane compounds (b) can be found in U.S. Pat. Nos. 6,313,217, 3,419,593, 4,631, 310 and 3,775,452 incorporated by reference.

The curable silicone composition further comprises (c) a hydrosilylation catalyst, for the addition reaction (hydrosilylation) between the groups having aliphatic carbon-carbon double bonds of component (b) and the Si-bonded hydrogen atoms of compound (a). Suitable hydrosilylation catalysts include metals, such as platinum, rhodium, palladium, ruthenium and iridium, fixed optionally on finely divided support materials, such as active charcoal, aluminum oxide or silicon dioxide. Particularly suitable is the use of platinum and platinum compounds, more in particular, those platinum compounds that are soluble in organopolysiloxanes. Suitable examples include finely divided metallic platinum, which may be present on supports, such as silicon dioxide, aluminum oxide, or activated carbon, compounds or complexes of platinum, such as platinum halides, e.g. $PtCl_4$, $H_2PtCl_6 \cdot 6H_2O$, $Na_2PtCl_4 \cdot 4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, in particular platinum-divinyltetramethyldisiloxane complexes with or without detectable inorganically-bonded-halogen content, bis(gamma-picoline)platinum dichloride, and also reaction products of platinum tetrachloride with olefin and primary amine, or with secondary amine, or with primary amine and secondary amine, for example the reaction product of a 1-octene solution of platinum tetrachloride with sec-butylamine, or ammonium-platinum complexes, platinum catalysts for one-component systems, for example microencapsulated platinum complexes, or platinum-acetylide complexes. Still further suitable Pt complexes include platinum (O) alkylene complexes as disclosed in U.S. Pat. No. 4,631,310.

The hydrosilylation catalyst can also be used in microencapsulated form, in which case the solid that envelops the catalyst, is finely divided and is insoluble in the organopolysiloxane. Examples include thermoplastic polymers, such as polyester resins or silicone resins. The hydrosilylation catalyst can also be used in the form of an inclusion compound, for example in a cyclodextrin as is disclosed in U.S. Pat. No. 6,313,217.

The quantity of hydrosilylation catalyst used depends on the desired rate of crosslinking and economic considerations. Typically, the catalyst will be used in an amount from 0.1 to 500 ppm by weight (parts by weight per million parts by weigh), for example between 2 and 400 ppm by weight of elemental platinum and based on the total weight of the components (a) and (b) of the curable silicone composition. The hydrosilylation catalyst is used in an amount sufficient to allow the curable silicone composition to be cured in a reasonable amount of time, such as an hour or less, at a reasonable elevated temperature, such as 50° C. or higher.

In accordance with the invention, the curable silicone composition further comprises (d) an amino compound. The amino compound is an organic compound having (1) an amino function of the formula —NHR wherein R is hydrogen or an organic group and (2) a silyl group of the formula —$SiR^1_n(OR^2)_{3-n}$ wherein $R^1$ represents an alkyl or aryl group, $R^2$ represents an alkyl group of 2 to 6 carbon atoms and n is 1 or 2. In accordance with one embodiment, the amino compound (d) can be represented by formula (IV):

$$HRN\text{-}L\text{-}SiR^1_n(OR^2)_{3-n} \tag{IV}$$

wherein R represents a hydrogen or an organic group, $R^1$ represents an alkyl or aryl group, $R^2$ represents an alkyl group of 2 to 6 carbon atoms, n represents an integer of 1 or 2 and L represents a organic divalent linking group, such as for example an aliphatic or aromatic hydrocarbon group that may include one or more heteroatoms such as oxygen and nitrogen or functional groups such as an ester group, an amido group or a carbonyl group or halogens. Examples of linking group L include an alkylene group and an arylene group. Particular suitable amino compounds include an amino compound according to formula (IV) wherein linking group L is an aliphatic group having 2 to 10 carbon atoms, R is hydrogen, n is 0 and $R^2$ represents an ethyl group. Examples of amino compounds according to the above formula (IV) include 3-aminopropyl triethoxysilane, 3-aminopropyl methyl diethoxysilane, 4-aminobutyltriethoxysilane and

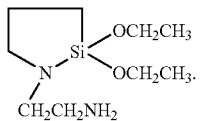

The amount of the amino compound (d) that should be added generally depends on the nature of the amino compound and the other components of the curable silicone composition and the fluoropolymer layer. Suitable amounts can be readily determined by routine experimentation. Typical amounts of amino compound added to the curable silicone composition are between 0.3 and 5% by weight, particularly suitable amounts are between 0.5 and 4% by weight, based on the total weight of the curable silicone composition.

The curable silicone composition may comprise further optional additives. Additives that may be present include those that serve for controlled establishment of the processing time (pot life) and rate of crosslinking of the curable silicone composition. Inhibitors, commonly known in the art can be added to the extent they do not adversely affect the bonding between the fluoropolymer layer and silicone layer. If transparency of the overall composition is a consideration, the additives should be selected so as to not adversely affect the desired transparency of the silicone layer and overall composition.

A curable silicone composition as described above can be prepared by homogeneously mixing the compounds (a), (b), (c), (d) and any other additives, using mixing means, such as a spatula, a drum roller, a mechanical stirrer or a mixer, such as a Myers mixer, sigmoid blade mixer, three-roll mill, two-roll mill, Baker Perkins type mixer, and other known mixers. The order of mixing is generally not critical. It is possible to mix all components in one mixing step immediately prior to the intended use of the curable silicone composition. Alternatively, certain components can be premixed to form two or more packages that can be stored, if desired, and then mixed in a final step immediately prior to the intended use thereof. For example, in one embodiment, components (c) and (d) and a portion of component (b), along with optional additives such as fillers, can be mixed to provide a first package. Separately, reagent (a) can be mixed with the remaining portion of reagent (b) to provide a second package. These two packages can then be stored until the composition is desired, and then homogeneously mixed.

Suitable curable silicone compositions to which the amino compound in accordance with the invention can be added include those disclosed in for example U.S. Pat. No. 6,313,217; U.S. Publ. 2004006173; U.S. Pat. Nos. 4,631,310 and 5,569,689. Examples of commercially available curable compositions to which the amino compound can be added for improving the bonding with a fluoropolymer layer include Silastic®9252/900P, commercially available from Dow Corning, and Elastosil®LR 7665, commercially available from Wacker Chemie. Typically these commercially available curable silicone compositions comprise a two package system, comprising components (a), (b), (c) and further additives. Component (d), the amino compound, can be added during the homogeneous mixing of the two packages prior to the intended use.

Method of Bonding the Layers Together and Producing a Protective Layer

After making a homogeneous mixture of the components (a), (b), (c), (d) and optional additives of the curable silicone composition, the curable silicon composition can be brought into contact with the fluoropolymer layer, typically provided as a fluoropolymer film. In one embodiment of the invention, the curable silicone composition can be coated on top of the fluoropolymer layer. In an alternative embodiment of the invention, the curable silicone layer can be coated onto an article to which it is desired to bond the fluoropolymer layer or film for example for use as a protective film. Subsequently the fluoropolymer layer can be applied on top of the curable silicone layer. Curing of the silicone layer and simultaneous bonding of this layer to the fluoropolymer layer may be effected by heating the fluoropolymer layer in contact with the silicone layer to a temperature of 50° C. to 220° C. and for a time sufficient to cure the silicone compound. The heating may further be carried out while simultaneously applying pressure.

The invention will now be described with reference to the following examples without however the intention to limit the invention thereto. All parts are by weight unless indicated otherwise.

EXAMPLES

In the following examples and comparative examples, bonding has been tested between a fluoropolymer layer and a silicone layer. Therefor, various laminates of fluoropolymers and silicone compounds were prepared.

Abbreviations:

Silastic® 9252/900P: 40 Durometer, 2-part, 1 to 1 mix, translucent, Pt cured, liquid silicone rubber, available from Dow Corning Corporation, Midland, Mich.

Elastosil® LR 7665: two component Pt cured, liquid silicone rubber, available from Wacker Chemie AG, Munich, Germany.

S 60 HS: Scotchlite® 60 HS: high strength glass microspheres, density 0.6 kg/l and compressibility 1270 bar, commercially available from 3M Company, St. Paul, Minn.

FC-1: fluoroplastic comprising 60% TFE, 22% VDF and 18% HFP

FC-2: high extrusion speed, multimodal THV, made according to the procedure as outlined in WO 00/69969, example FC-3: fluoroplastic comprising 47.6% TFE, 23.1% VDF, 25.3 HFP and 4% PPVE-1.

PPVE-1: $CF_3CF_2CF_2OCF=CF_2$

Silquest™ A 1100: aminopropyl triethoxysilane, available from Crompton Corporation, now Chemtura Corporation, Middlebury, Conn.

1. Preparation of Laminates of Fluoropolymer with Pt Curable Silicone Composition.

Triethoxy aminopropyl silane, in amounts as indicated in the examples, was added to a 50/50 blend of a two-package commercial available platinum cured liquid silicone compound. After making a homogeneous mixture, the mixture was applied between two layers of fluoropolymer film having a thickness of 0.1 mm. The two sheets of fluoropolymer were separated by a PTFE spacer having a thickness of 0.3 mm. A polyester filmstrip was inserted at one end to act as release film, in order to be able to test the peel strength after curing. The laminate was made using a hot press (Agila 96/90) at 120° C. during 30 min, allowing the silicone composition to cure and allowing the formation of the bond between the fluoropolymer layers and the silicone layer in between. After cooling to room temperature for 24 hours, the laminated sheets were cut to a width of about 1 cm. The adhesion between the layers was evaluated in accordance with ASTM D-1876, commonly known as a "T-peel" test, using an Instron™ mechanical tester. Crosshead speed was 50 mm/min. The results reported (N/cm) are average values of two specimens.

2. Preparation of Laminates of Fluoropolymer Comprising Glass Microspheres with Pt Curable Silicone Composition In a first step, commercially available glass microspheres Scotchlite™ S60HS, in amounts as given in the examples, were blended with the fluoropolymer in granulate form. Fluoropolymer sheets were prepared by cast film extrusion at a temperature between 250-280° C. In a second step, laminates of the fluoropolymer films comprising glass microspheres, were made with commercially available 2-package Pt curable silicone compositions to which was added an amount of amino compound, as given in the examples. The laminates were made according to the method described above.

EXAMPLES

Examples 1 and 2 and Comparative Example C-1

In examples 1 and 2 laminates was made according to the general procedure 1. Fluoropolymers, as given in table 1, were laminated against Silastic® 9252/900P (50/50 blend) to which was added 0.5% amino compound Silquest® A1100 Comparative example C-1 was made in the same way, but without addition of amino compound. After curing and cooling to room temperature, the bond strength was evaluated after 24 hrs. The results are given in table 1.

TABLE 1

Bond strength of laminates made from fluoropolymer and 2-component Pt curable silicone

| Ex | Fluoropolymer | Curable Silicone | % A1100 | Bond strength Average (N/cm) |
|---|---|---|---|---|
| 1 | FC-1 | Silastic ® 9252/900P | 0.5 | 11 |
| 2 | FC-2 | Silastic ® 9252/900P | 0.5 | 9 |
| C-1 | FC-2 | Silastic ® 9252/900P | 0 | no bond |

Examples 3 to 6 and Comparative Examples C-2 and C-3

In examples 3 to 6, fluoropolymers, blended with glass microspheres Scotchlite™ S60HS, were laminated against 2-package Pt curable silicone compound, comprising amino compound Silquest™ A 1100, according to the general procedure 2. The comparative examples were made in the same way, without the addition of amino compound. The composition of the samples and the results of the bond strength are given in table 2.

TABLE 2

Bond strength of laminates made from fluoropolymers comprising glass microspheres and curable silicone

| Ex | Fluoropolymer | % S 60 HS | Curable Silicone | % A1100 | Bond strength (Average) (N/cm) |
|---|---|---|---|---|---|
| 3 | FC-1 | 2 | Silastic ® 9252/900P | 0.5 | 20 |
| 4 | FC-1 | 2 | Elastosil ® LR 7665 | 0.5 | 16.7 |
| 5 | FC-1 | 0.1 | Silastic ® 9252/900P | 0.5 | 7 |
| 6 | FC-3 | 0.5 | Silastic ® 9252/900P | 0.5 | 20 |
| C-2 | FC-1 | 2 | Elastosil ® LR 7665 | 0 | 0 |
| C-3 | FC-1 | 0.1 | Silastic ® 9252/900P | 0 | 0 |

What is claimed is:

1. Method of bonding a fluoropolymer layer to a silicone layer by (i) providing a fluoropolymer layer comprising a fluoropolymer capable of being dehydrofluorinated, (ii) providing a silicone layer comprising a curable silicone composition comprising (a) an organopolysiloxane compound having SiH groups, (b) an organopolysiloxane compound having aliphatic carbon-carbon unsaturated bonds, (c) a hydrosilylation catalyst and (d) an amino compound having (1) an amine function of the formula —NHR wherein R is hydrogen or an organic group and (2) a silyl group of the formula —SiR$^1_n$(OR$^2$)$_{3-n}$ wherein R$^1$ represents an alkyl or aryl group, R$^2$ represents an alkyl group of 2 to 6 carbon atoms and n is 1 or 2 and (iii) contacting said silicone layer and said fluoropolymer layer and causing said curable silicone composition of said silicone layer to cure.

2. Method according to claim 1 wherein said curable silicone composition is cured to subjecting the curable silicone composition to an elevated temperature of at least 50° C.

3. Method according to claim 1 wherein said amino compound corresponds to the general formula:

HRN-L-SiR$^1_n$(OR$^2$)$_{3-n}$ wherein R, R$^1$, R$^2$ and n have the same meaning as defined in claim 1 and wherein L represents an organic divalent linking group.

4. Method according to claim 3 wherein said organic divalent linking group L is an aliphatic group having 2 to 10 carbon atoms, R is hydrogen and n is 0 and R$^2$ represents ethyl.

5. Method according to claim 1 wherein the amount of said amino compound in said curable silicone composition is between 0.3 and 4% by weight.

6. Method according to claim 1 wherein said hydrosilylation catalyst comprises a platinum catalyst.

7. Method according to claim 1 wherein said fluoropolymer is a fluoropolymer comprising repeating units derived from tetrafluoroethylene, vinylidene fluoride and hexafluoropropylene.

8. Method according to claims 1 wherein said fluoropolymer layer further comprises glass microspheres.

9. An article obtainable by the method of claim 1.

* * * * *

UNITED STATES PATENT AND TRADEMARK OFFICE
CERTIFICATE OF CORRECTION

PATENT NO. : 7,507,444 B2
APPLICATION NO. : 11/424633
DATED : March 24, 2009
INVENTOR(S) : Steven G. Corveleyn et al.

It is certified that error appears in the above-identified patent and that said Letters Patent is hereby corrected as shown below:

On the title page item (57), Column 2 (Abstract)
Line 11, delete "—$SiR^1_n(OR^2)_{3-n}$" and insert in place thereof -- —$SiR^1_n(OR^2)_{3-n}$ --.

Column 11
Line 3, in Claim 1, delete "by" and insert in place thereof -- comprising --.

Line 18, in Claim 2, delete "to" and insert in place thereof -- by --.

Column 12
Line 3, in Claim 3, delete "represents an organic divalent linking group." and insert the same on Column 12, line 2, after "L" as a continuation.

Line 18, in Claim 8, delete "claims" and insert in place thereof -- claim --.

Signed and Sealed this

Twenty-seventh Day of October, 2009

David J. Kappos
*Director of the United States Patent and Trademark Office*